(12) United States Patent
Azegami et al.

(10) Patent No.: US 9,231,441 B2
(45) Date of Patent: Jan. 5, 2016

(54) WIND POWER GENERATION SYSTEM, DEVICE USING WIND POWER GENERATION SYSTEM, AND METHOD FOR OPERATING SAME

(75) Inventors: Kenichi Azegami, Tokyo (JP); Kiyoshi Sakamoto, Tokyo (JP); Takuji Yanagibashi, Tokyo (JP); Takashi Matsunobu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 126 days.

(21) Appl. No.: 14/113,770

(22) PCT Filed: Apr. 25, 2011

(86) PCT No.: PCT/JP2011/002399
§ 371 (c)(1),
(2), (4) Date: Nov. 20, 2013

(87) PCT Pub. No.: WO2012/147118
PCT Pub. Date: Nov. 1, 2012

(65) Prior Publication Data
US 2014/0103656 A1   Apr. 17, 2014

(51) Int. Cl.
*H02J 11/00* (2006.01)
*F03D 9/00* (2006.01)
(Continued)

(52) U.S. Cl.
CPC . *H02J 11/00* (2013.01); *F03D 1/02* (2013.01); *F03D 7/026* (2013.01); *F03D 9/002* (2013.01); *F03D 9/003* (2013.01); *H02P 9/04* (2013.01);
(Continued)

(58) Field of Classification Search
CPC ........... F03D 1/02; F03D 9/002; F03D 9/003; F03D 7/026; H02P 9/04; F05B 2240/2213; F05B 2260/85; H02J 11/00; Y02E 10/723

USPC ...................................................... 290/44, 55
See application file for complete search history.

(56) References Cited

U.S. PATENT DOCUMENTS 5,876,181 A * 3/1999 Shin .............................. 415/2.1
6,921,985 B2   7/2005 Janssen et al.
(Continued)

FOREIGN PATENT DOCUMENTS

DE     27 42 559 B1    10/1978
DE     200 20 232 U1    1/2002
(Continued)

OTHER PUBLICATIONS

DE 2742559 english translation.*
(Continued)

*Primary Examiner* — Tulsidas C Patel
*Assistant Examiner* — Viet Nguyen
(74) *Attorney, Agent, or Firm* — Crowell & Moring LLP

(57) ABSTRACT

A wind turbine able to generate power irrespective of a presence of and a state of a power grid is disclosed. Specifically, a wind power generation system is provided with a wind turbine, the wind turbine including a blade that rotates in response to the wind, a generator that rotates with rotation of the blade to generate power, and an auxiliary machine that controls a pitch angle of the blade. The auxiliary machine is driven by the generated power of a downwind type wind turbine to which a permanent magnet type generator is mounted and which generates power in a state in which a blade of the downwind type wind turbine rotating in response to the wind faces downwind.

7 Claims, 13 Drawing Sheets

(51) Int. Cl.
*H02P 9/04* (2006.01)
*F03D 7/02* (2006.01)
*F03D 1/02* (2006.01)

(52) U.S. Cl.
CPC ..... *F05B 2240/2213* (2013.01); *F05B 2260/85* (2013.01); *Y02E 10/723* (2013.01); *Y02E 10/725* (2013.01); *Y10T 307/625* (2015.04)

(56) References Cited

U.S. PATENT DOCUMENTS

| | | | |
|---|---|---|---|
| 7,071,578 B1 | 7/2006 | Shibata et al. | |
| 2004/0096327 A1* | 5/2004 | Appa et al. | 416/1 |
| 2004/0178639 A1* | 9/2004 | Wobben | 290/44 |
| 2004/0253093 A1* | 12/2004 | Shibata et al. | 415/4.1 |
| 2007/0216165 A1 | 9/2007 | Oohara et al. | |
| 2009/0046289 A1* | 2/2009 | Caldwell et al. | 356/341 |
| 2009/0047129 A1* | 2/2009 | Yoshida | 416/9 |
| 2010/0090463 A1* | 4/2010 | Nies et al. | 290/44 |
| 2010/0207479 A1* | 8/2010 | Madawala | 310/166 |
| 2011/0082598 A1* | 4/2011 | Boretto et al. | 700/291 |
| 2011/0175355 A1* | 7/2011 | Rosenvard | 290/44 |
| 2011/0215640 A1* | 9/2011 | Donnelly et al. | 307/21 |
| 2011/0248512 A1* | 10/2011 | Lee | 290/1 R |
| 2013/0113212 A1* | 5/2013 | Sakamoto et al. | 290/44 |
| 2013/0270823 A1* | 10/2013 | Hannon | 290/44 |
| 2013/0307277 A1* | 11/2013 | Rosenvard | 290/55 |
| 2014/0167419 A1* | 6/2014 | Quek | 290/55 |
| 2014/0232118 A1* | 8/2014 | Luigi et al. | 290/55 |

FOREIGN PATENT DOCUMENTS

| | | |
|---|---|---|
| EP | 1 128 064 A2 | 8/2001 |
| JP | 61-167482 U | 10/1986 |
| JP | 6-289189 A | 10/1994 |
| JP | 9-60575 A | 3/1997 |
| JP | 11-94988 A | 4/1999 |
| JP | 2004-44508 A | 2/2004 |
| JP | 2004-108163 | 4/2004 |
| JP | 2005-033915 A | 2/2005 |
| JP | 2006-2726 A | 1/2006 |
| JP | 2007-064062 A | 3/2007 |
| JP | 2007-239599 A | 9/2007 |
| JP | 2007-252028 A | 9/2007 |
| WO | WO 2010/040229 A1 | 4/2010 |

OTHER PUBLICATIONS

European Search Report dated Sep. 4, 2014 (seven pages).
International Search Report (PCT/ISA/210) dated Jul. 19, 2011 (Two (2) pages).

* cited by examiner

WIND POWER GENERATION SYSTEM, DEVICE USING WIND POWER GENERATION SYSTEM, AND METHOD FOR OPERATING SAME

TECHNICAL FIELD

The present invention relates to a wind power generation system, a device using the wind power generation system, and a method for operating the wind power generation system.

BACKGROUND ART

Wind power generation systems, as well as solar batteries etc., are quickly spreading as renewable energies. Conventional wind power generation systems include, for example, one disclosed in Patent Document 1. Patent Document 1 discloses a technology of using an uninterruptible power source in a wind power generation system.

CITATION LIST

Patent Literature

PTL 1: U.S. Pat. No. 6,921,985

SUMMARY OF INVENTION

Technical Problem

However, in the above method, the power of the control system of the wind turbine is provided by the power grid at normal operation of the power grid. To provide the power of the control system in case of fault of the power grid, an uninterruptible power source may be needed. The uninterruptible power source has an available duration for power supply. In case of a power outage longer than the available duration, it is difficult to continue operating the control system. After that, when the power grid is recovered, the activation time is needed. Even in a wind speed range in which power generation is possible, it is difficult to supply power to the power grid immediately.

In consideration of the above point, it is desirable to provide a wind turbine that enables power generation irrespective of the presence of and a state of a power grid.

Solution to Problem

For addressing the above point, a wind power generation system of the present invention provided with a wind turbine, the wind turbine including: a blade that rotates in response to the wind; a generator that rotates in response to rotation of the blade to generate power; and auxiliary machines. One of the auxiliary machines controls a pitch angle of the blade. The auxiliary machines are driven by generated power of a downwind type wind turbine to which a permanent magnet type generator is mounted and which generates power in a state in which a blade of the downwind type wind turbine rotating in response to the wind faces downwind.

Advantageous Effects of Invention

According to the present invention, it becomes possible to provide a wind turbine able to generate power irrespective of the presence of and a state of a power grid.

DESCRIPTION OF EMBODIMENTS

Hereafter, preferred examples to achieve the present invention are explained. The followings are just examples, and do not identify implementations.

Example 1

Figure 1:
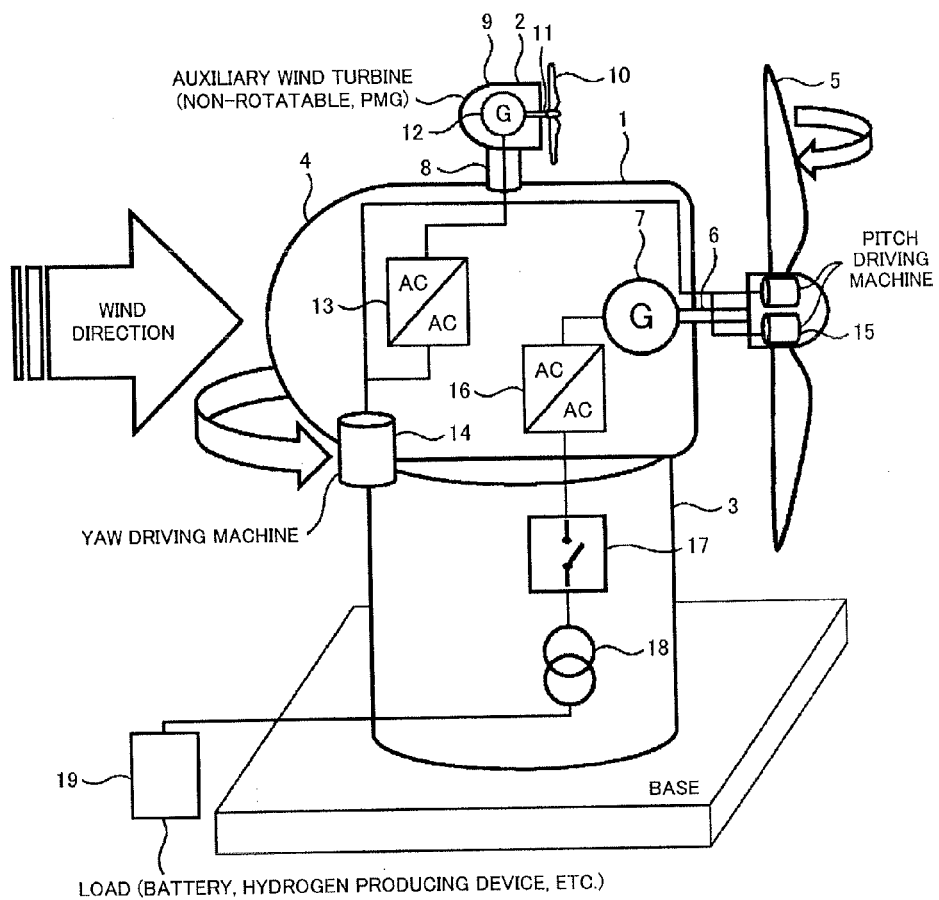
FIG. 1 is a one-line diagram of a wind power generation system of Example 1.

Example 1 is explained using FIGS. 1 to 4. As shown in FIG. 1, a wind power generation system of this example mainly includes a main wind turbine 1 to supply generated power to a load and a power grid and an auxiliary wind turbine 2 to supply power to after-mentioned auxiliary machines.

The wind turbine 1 is built on a base, and includes a column 3 supporting the overall wind turbine 1, a nacelle 4 rotatably installed horizontally to the column 3 at the upper part of the column 3, and three blades 5 that are placed at the head of the nacelle 4 and that rotate in response to the wind. Inside the nacelle 4, a shaft 6 and a generator 7 that are connected to the blades 5 are placed. The shaft 6 is connected to the rotation shaft of the rotor of the generator 7. As a result, as the blades 5 rotate, the rotor of the generator 7 rotates via the shaft 6, and the wind turbine 1 generates power.

The wind turbine 1 in this example is a downwind type wind turbine that generates power while the blades 5 face downwind.

The wind turbine 2 is a smaller wind turbine than the wind turbine 1 and installed on the nacelle 4 of the wind turbine 1. The wind turbine 2 includes a column 8 that supports the overall wind turbine 2 on the nacelle 4, a nacelle 9 installed on the upper part of this column 8 horizontally to the column 8, and three blades 10 placed at the head of the nacelle 9 and rotating in response to the wind. Unlike the nacelle 4, the nacelle 9 is secured on the column and not rotatable horizontally. Inside the nacelle 9, a shaft 11 connected to the blades 10 and a permanent magnet type generator 12 that may need no excitation current are placed. The shaft 11 is connected to the rotation shaft of the rotor of the generator 12. As the blades 10 rotate, the rotor of the generator 12 rotates via the shaft 11, and the wind turbine 2 generates power. The blades 10 face in the same direction as the blades 5.

The blades 10 are secured to face in the same direction as the blades 5. Since power generation is performed while the blades 5 face downwind, the wind turbine 2 is also a downwind type wind turbine.

Figure 2:
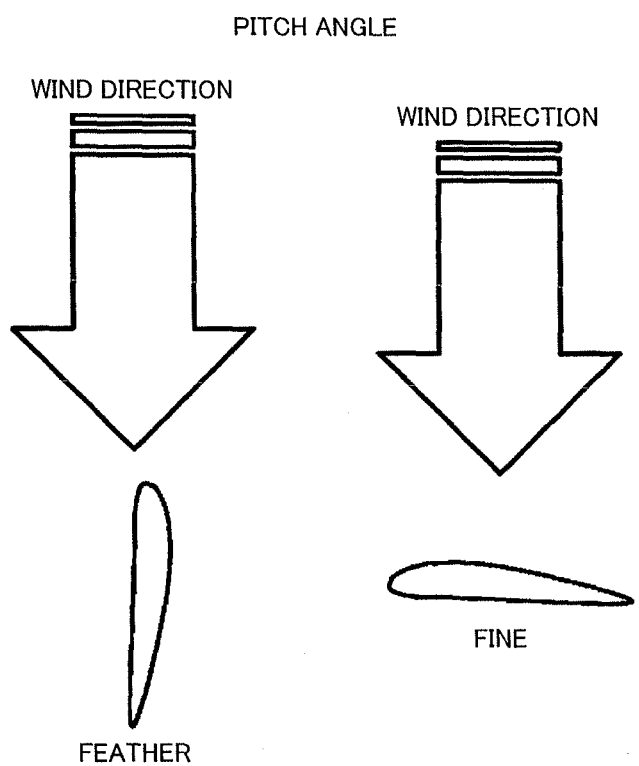
FIG. 2 explains a pitch angle of a blade forming a wind turbine.

A power conversion system 13 is connected to the generator 12, and converts a voltage of an irregular frequency in response to a time variation of the wind from the generator 12 to a rated frequency. A yaw (that means rotation in the horizontal plane perpendicular to the column 3) driving machine 14 and a pitch driving machine 15 of the nacelle 4 are connected to the opposite end of the power conversion system 13 to the generator 12. The yaw driving machine 14 adjusts a rotational angle in the horizontal plane of the nacelle 4. In response to a wind direction obtained from an anemometer not shown, the blades 5 are adjusted to face downwind. The wind speed may be measured by the anemometer. The anemometer is able to be installed to or around the wind power generation system. As shown in FIG. 2, the pitch driving machine 15 changes a swept area of the blades 5 in the wind direction. A pitch angle of the blades 5 whose swept area is the largest and which faces perpendicularly to the wind direction is called a fine pitch angle. A pitch angle of the blades 5 whose swept area is the smallest is called a feather pitch angle. It is possible to angle the blades 5 intermediately of these extreme angles. In this example, the yaw driving machine 14 and pitch driving machine 15 are connected to the generator 12 via the power conversion system 13. The yaw driving machine 14, pitch driving machine 15, etc. that control the wind turbine are generally called auxiliary machines.

On the other hand, the generator 7 of the wind turbine 1, which is the main wind turbine that supplies generated power to the load, is connected to a switch 17 via a power converter 16 and to a transformer 18 via the switch 17. After the transformer converts the generated power to a required voltage, the generated power is supplied to the load 19. In each example in this specification, the direct power supply to the load such as a micro grid or an offshore wind turbine is explained, in which the generated power is not supplied to the power grid. This is different from a method in which the power for auxiliary machines is provided from a conventional power grid and is temporarily provided from an uninterruptible power source in case of detachment of the auxiliary machines from the power grid. In each example, the power grid is not essential. It is possible to use the power generation system of each example in an independent power network. It is possible to place the power generation system in a region where a power network is not popular. Even when a power network is present, the power generation system is useful as an (additional) emergency power supply at the outage of a normal power supply (including an emergency power supply) due to a disaster etc. In a nuclear power plant etc. in which delay of cooling due to the outage of power supply may cause a serious accident, it is more effective that the power generation system of each example is connected to the nuclear power plant to supply power to the nuclear power plant as an emergency power generation system. In this power supply, cease of the power supply is able to be avoided by switching the power supply to the wind power generation system immediately when all the power supplies to the nuclear power plant stop. An outage of power supply can be determined, e.g., by installing a measurement device for voltage values and current values in the middle of a power supply circuit connected to other than a wind power generation system. A switch may be provided to switch the power supply circuit to the wind power generation system when a signal from the measurement device falls below a predetermined threshold or stops. Then, an instruction may be sent to the switch.

When the wind power generation system is combined with a nuclear power plant, it is assumed that it is difficult for the wind power generation system alone to provide the power, e.g., for cooling the nuclear power plant at a low wind speed. In such a case, a solar power generation system is effectively placed as an annex to complement the output from the wind power generation system. By use of complementary combination of the power generation system dependent on a wind speed and the power generation system dependent on solar radiation intensity, it becomes easier to avoid shortage of required power as compared to a case where the wind power generation system is used alone.

More preferably, an auxiliary power supply battery is provided in the nuclear power plant, and the generated power from both of the power generation systems contributes to charging of the auxiliary power supply battery. Even when sufficient wind speed or sufficient solar radiation intensity is not obtained, power is able to be supplied to the nuclear power plant from the battery to more easily avoid shortage of the required power.

As the operation method, the operation method of the wind power generation system exampled in each example is used. Within a wind speed range in which power generation is possible, the generated power from the wind power generation system may be supplied to the nuclear power plant and auxiliary power supply battery. Outside the wind speed range in which the power generation is possible, the generated power from the solar power generation system and/or the power from the auxiliary power supply battery may be supplied. As a result, the complementarity is improved therebetween.

The above operation independent of the power grid is a major feature of the present invention shown in this specification. It is clear that power transmission to the power grid is also possible.

Figure 3:
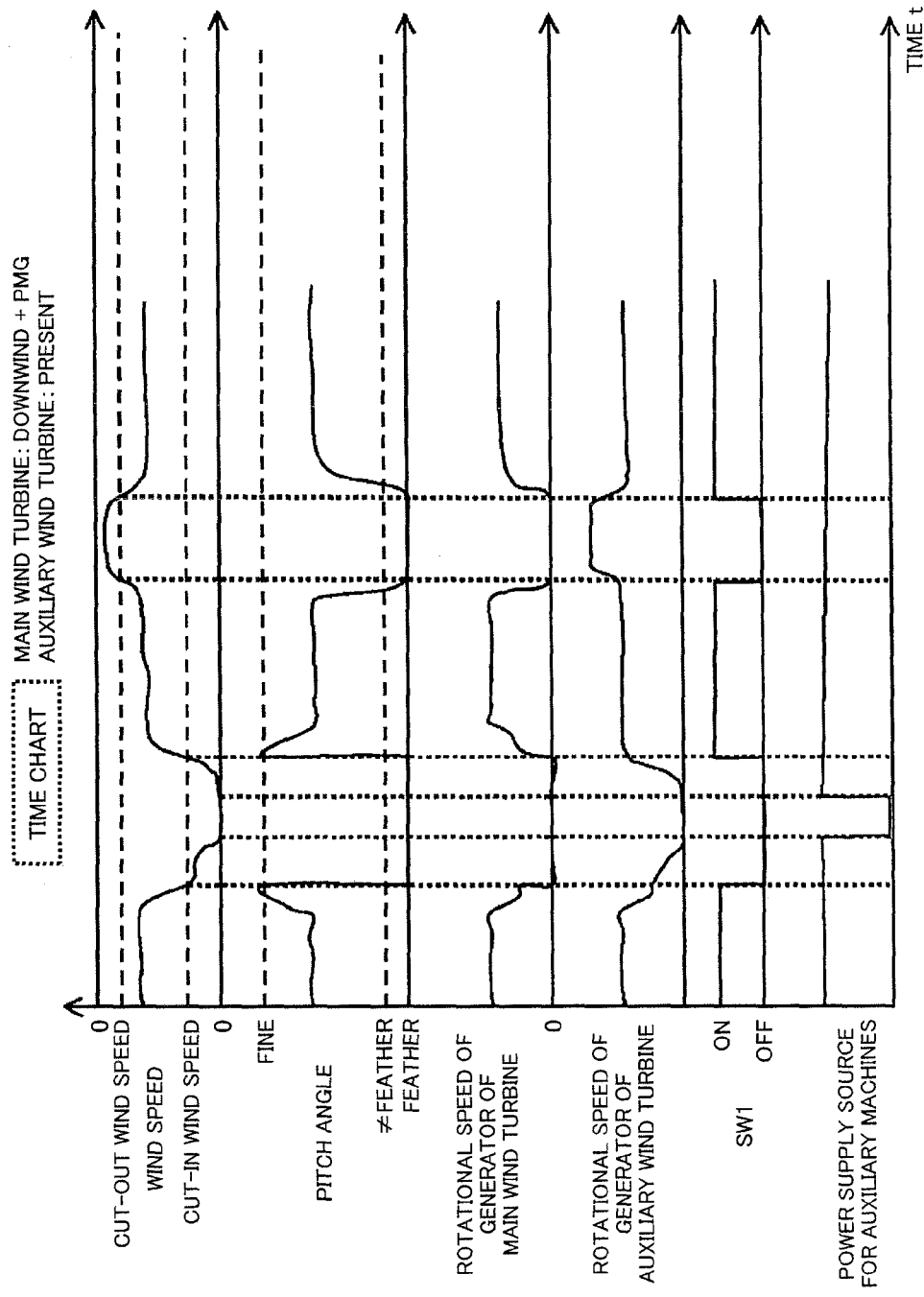
FIG. 3 shows a time chart of the wind power generation system of Example 1.

The method for operating the wind power generation system constituted as mentioned above is explained using FIG. 3 and FIG. 4. The upper stage of FIG. 3 shows temporal variations of a wind speed measured by the anemometer. A cut-in wind speed shows a lowermost wind speed for the power generation by the wind turbine 1 or for the supply of generated power to the load by the wind turbine 1 without changing the pitch angle to a feather pitch angle. A cut-out wind speed shows an uppermost wind speed for the power generation by the wind turbine 1 or for the supply of the generated power to the load by the wind turbine 1 without changing the pitch angle to a feather pitch angle. That is, the wind turbine 1 generates power at or over the cut-in wind speed and at or under the cut-out wind speed.

In FIG. 3, at first, the wind speed shows a uniform value in the wind speed range in which the power generation is possible, and is in the normal state. In this case, the pitch angle of the blades 5 is held around the intermediate angle between the fine pitch angle and feather pitch angle. The generator 7 of the main wind turbine and the generator 12 of the auxiliary wind turbine generate power with holding generally constant rotational speeds. The switch 17 is closed (ON state) and the generated power from the generator 7 is supplied to the load 19. The generated power from the generator 12 is supplied also to the auxiliary machines.

Next, when the wind speed decreases suddenly to approach the cut-in wind speed, the pitch angle of the blades 5 transitions to the fine pitch angle such that the blades 5 are exposed to as much wind as possible. However, as the wind itself weakens, the rotational speed of the generator 7 and the rotational speed of the generator 12 of the auxiliary wind turbine decrease. Also in this case, the switch 17 is still in the closed state, and the generated power is supplied to the load.

When the wind speed decreases further and falls below the cut-in wind speed, the pitch angle of the blades 5 is changed to the feather pitch angle in consideration of safety so that the blades 5 are not swept by the wind. Then, the blades 5 stop rotating, and the generator 7 that rotates with the rotation of the blades 5 and generates power stops generating power. As the power generation is stopped, the switch 17 is opened (OFF state) to stop exchange between the generator 7 and load 19. The yaw is not controlled so that the yaw moves freely in response to the wind direction (free yaw). Since the main wind turbine 1 is the downwind type wind turbine, the blades 5 face downwind in case of free yaw like the so-called weathervane. On the other hand, the pitch angle is not controlled in the auxiliary wind turbine, the blades 10 rotate slowly, and the generator 12 continues power generation. The auxiliary wind turbine 2 is not yawed, and is secured to the nacelle 4. The secured nacelle 4 itself rotates in response to the wind direction. Since the blades 5 of the wind turbine 1, which is the downwind type wind turbine, and the blades 10 of the auxiliary wind turbine 2 face in the same direction, the blades 10 also face downwind. Thus, the power generation can be continued. The auxiliary machines only control the pitch angle and the yaw, and do not need large power. The power supply for the auxiliary machines can be provided by even low generated power.

When the wind speed decreases further in this condition and the wind stops substantially, it is also difficult for the auxiliary wind turbine to rotate. In this case, the auxiliary machine power is not supplied and the auxiliary machines are stopped safely.

Then, when the wind speed increases again, the blades 10 of the auxiliary wind turbine restart rotating, and the auxiliary machine power supply is provided by rotating the generator 12. The auxiliary machine power supply is provided to restart the auxiliary machines. Also in this state, the blades 5 of the main wind turbine are still in the feather pitch angle not to rotate.

When the wind speed increases further to exceed the cut-in wind speed again, the pitch driving machine 15 changes the pitch angle from the feather pitch angle to fine pitch angle to rotate the blades 5. With the rotation of the blades 5, the generator 7 restarts power generation. The yaw driving machine 14 performs the yaw control. At the same time, the switch 17 is switched to the closed state to supply generated power to the load. After that, when the wind speed is between the cut-in wind speed and cut-out wind speed, the generator 7 maintains a certain rotation speed while adjusting the pitch angle.

When the wind speed becomes higher from this state, the pitch angle of the blades 5 is made close to the feather pitch angle not to apply excess wind pressure to the wind turbine 1. At this time, the rotational speed of the generator 7 decreases suddenly. On the other hand, since the pitch-angle of the blades 10 of the auxiliary wind turbine is not controlled, its rotational speed continues to increase.

When the wind speed becomes stronger to exceed the cut-out wind speed, the pitch angle of the blades 5 is switched to the feather pitch angle. Thereby, the blades 5 stop rotating, and the generator 7 also stops rotating. At the same time, the switch 17 is opened (OFF state) not to exchange power between the generator 7 and load 19. A free yaw condition is set as in the case where the wind speed is below the cut-in wind speed. Since the main wind turbine 1 is the downwind type wind turbine, the blades 5 as well as the so-called weathervane face downwind in the free yaw condition. The auxiliary wind turbine is not yawed, and secured to the nacelle 4. Since the blades 10 face in the same direction as the blades 5 of the downwind type wind turbine, the blades 10 face downwind. Since the pitch angle of the blades 10 is not controlled, the power generation is performed in response to the wind. Accordingly, the power generation is able to be continued even when the wind speed is at the cut-out wind speed or more. Therefore, the driving power source for the auxiliary machines can be provided.

After that, when the wind speed is at the cut-out wind speed or less, the pitch angle of the blades 5 shifts from the feather pitch angle to increase their swept area and to then rotate the blades 5. The yaw control is performed by the yaw driving machine 14. With the rotation of the blades 5, the generator 7 rotates to restart power generation. At the same time, the switch 17 is switched to the closed state to provide generated power to the load. After that, when the wind speed is between the cut-in wind speed and cut-out wind speed, the generator 7 maintains a certain rotational speed while adjusting the pitch angle.

Figure 4:
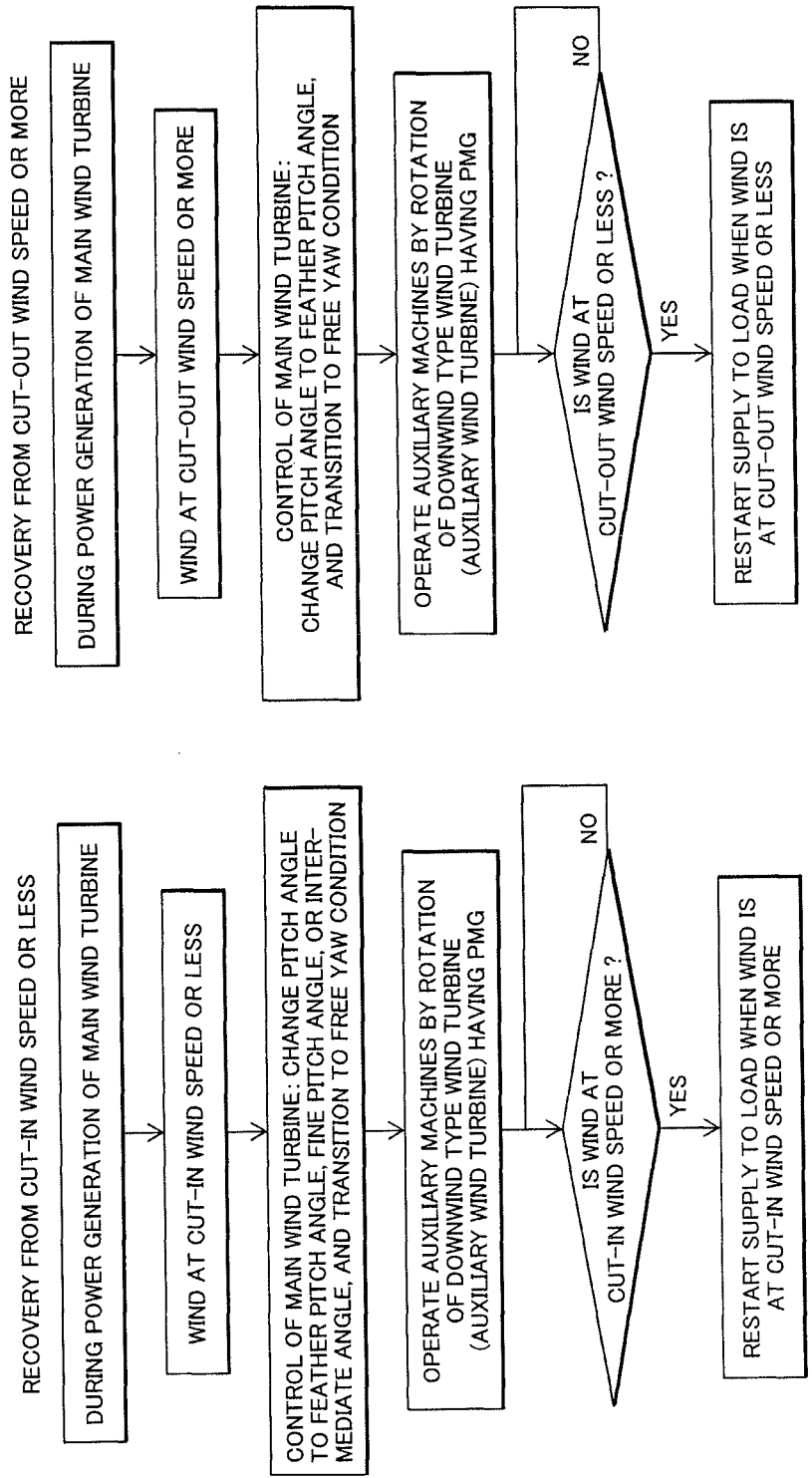
FIG. 4 explains an operation flow of the wind power generation system of Example 1.

This flow is as shown in FIG. 4. That is, when the wind speed is less than the cut-in wind speed, the pitch angle of the main wind turbine is changed to the feather pitch angle, and the free yaw condition is applied. As shown in FIG. 4, when the wind speed is less than the cut-in wind speed, the pitch angle is able to be in the fine pitch angle or in the intermediate angle between the feather pitch angle and fine pitch angle because it is difficult to consider that the blades 5 are swept by excess wind. Even when the wind speed is less than the cut-in wind speed, the auxiliary machine power supply is freely provided from the auxiliary wind turbine that faces downwind naturally to generate power without the yaw control. After that, when the wind speed is at the cut-in wind speed or more, the power generation can be restarted by performing the pitch-angle control and yaw control immediately.

When the wind speed exceeds the cut-out wind speed during the power generation by the main wind turbine, the pitch angle of the main wind turbine is changed to the feather pitch angle, and the yaw control enters the free yaw condition. Even when the wind speed exceeds the cut-out wind speed, the auxiliary machine power supply is freely provided from the auxiliary wind turbine that faces downwind naturally to generate power without the yaw control. After that, when the wind speed is at the cut-out wind speed or less, power generation is able to be restarted by performing the pitch-angle control and yaw control immediately.

In this example, the auxiliary wind turbine is the downwind type wind turbine requiring no yaw control and uses the permanent magnet type generator requiring no excitation current. Therefore, the power generation is possible in response to the wind irrespective of the presence of and the state of the power grid. It is not important whether the generator of the main wind turbine is the permanent magnet type generator. The yaw control is considered to be performed by the yaw control power source from the auxiliary wind turbine itself during the power generation. To achieve a blackout start to generate power without an additional external power supply after the power supply stops completely, it is desirable to provide a mode in which power generation is started without the yaw control. It is not important whether the yaw control is performed after a start of power generation. The pitch-angle control of the auxiliary wind turbine is freely performed during the power generation. When the wind stops and the power generation is stopped, the auxiliary wind turbine may need to wait while the pitch angle is other than the feather pitch angle to restart in response to the wind. It is preferable to wait while the pitch angle is in or near the fine pitch angle.

In this example, the auxiliary machine power supply is provided from only the auxiliary wind turbine. The supply from the generator 7 of the main wind turbine to the auxiliary machines is not excluded. When the main wind turbine is normal and a certain fault occurs in the auxiliary wind turbine, power is to be supplied to the load. When the auxiliary machine power supply is provided from only the auxiliary wind turbine, it is difficult to supply generated power to the load. Therefore, it is desirable that the auxiliary machine power supply is able to be supplied from both the auxiliary wind turbine and the main wind turbine.

In this example, the auxiliary wind turbine is smaller than the main wind turbine. Accordingly, the blades 10 become lighter than the blades 5 to rotate even by weak wind. That is, even the wind of less than the cut-in wind speed is able to rotate the blades 10 of the auxiliary wind turbine to provide the auxiliary machine power supply. The stress applied to the wind turbine may be contributed by the n-th power of the rotor diameter of the blades when the strong wind blows. As a result, the stress applied to the wind turbine becomes large as the blades are enlarged. Therefore, the auxiliary machine power supply can be provided by using the small wind turbine even in case of a storm exceeding the cut-out wind speed. Therefore, when the main wind turbine rotates in response to the wind equal to or over the cut-in wind speed and equal to or under the cut-out wind speed, the small wind turbine rotates. As a result, the auxiliary machine power supply is provided constantly. That is, irrespective of the state of the power grid, when the main wind turbine is able to generate power, the power generation is possible, and the operation time in which the wind turbine contributes to the power generation is made the maximum.

In this example, the auxiliary wind turbine is secured to cause the blades 10 to face downwind in the same direction as the blades 5 with securing the yaw drive. In light of the fact that the main wind turbine is the downwind type wind turbine and faces downwind constantly, the auxiliary wind turbine is able to be used as an upwind type wind turbine facing in the opposite direction to the blades 5 when the yaw drive is secured.

When the auxiliary wind turbine is used as the downwind type wind turbine, the yaw drive is in the free yaw condition and is not secured. When the auxiliary wind turbine is used as the downwind type wind turbine and the yaw drive is in the free yaw condition, the auxiliary wind turbine does not need to be placed on the nacelle 4 of the main wind turbine, and can be installed on a different place.

Example 2

Figure 5:
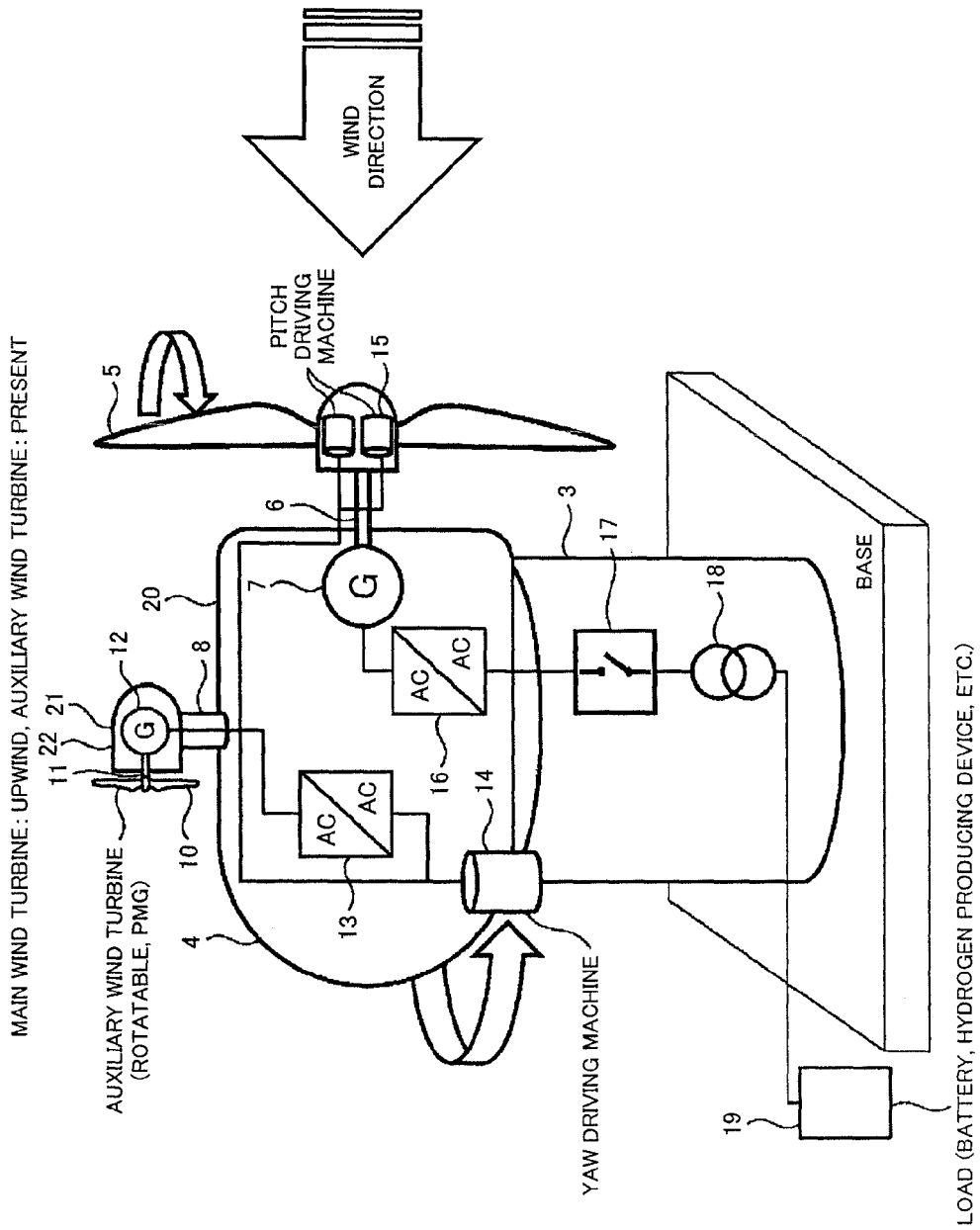
FIG. 5 shows a structure and one-line diagram of a wind power generation system of Example 2.
Figure 6:
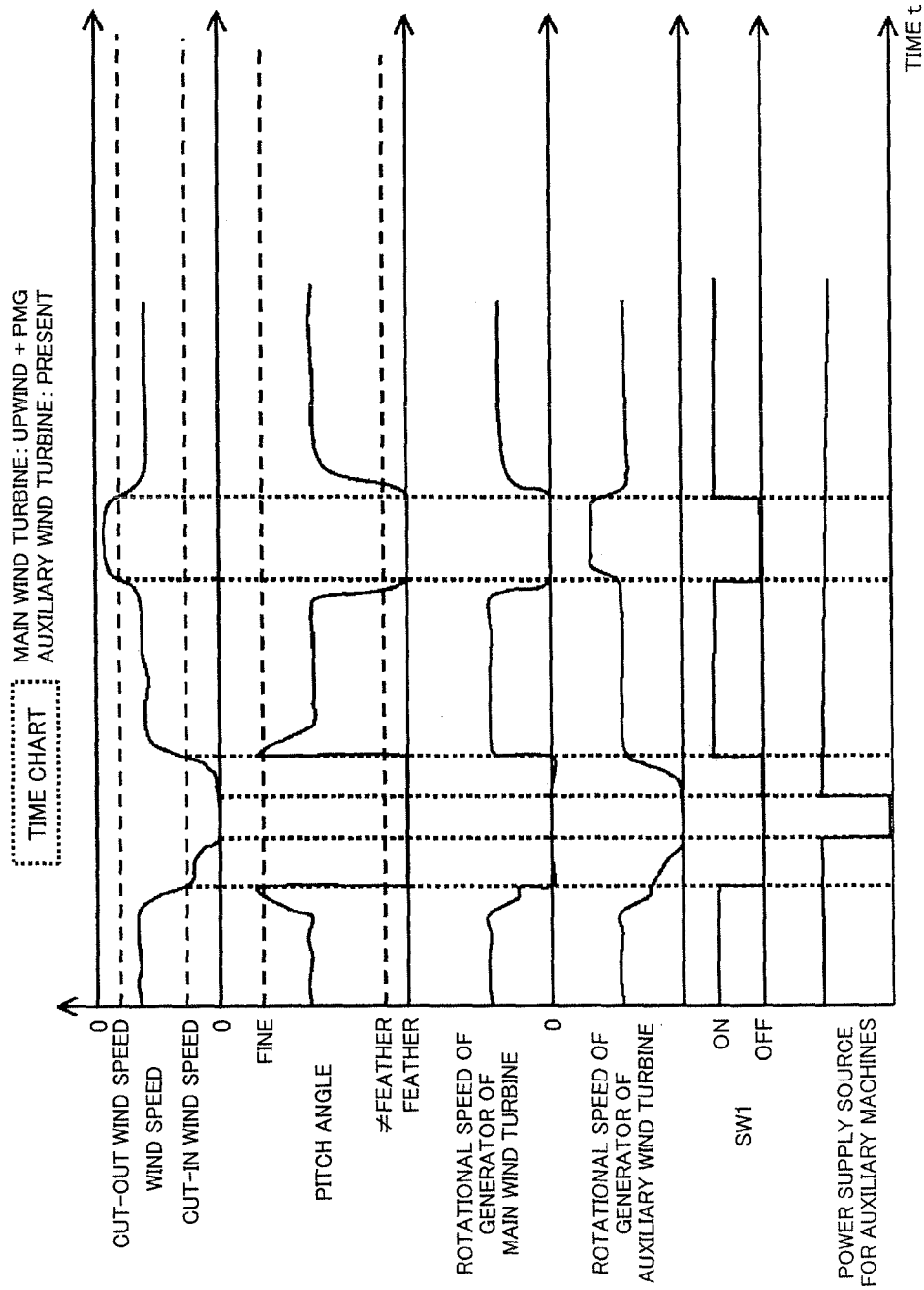
FIG. 6 shows a time chart of the wind power generation system of Example 2.
Figure 7:
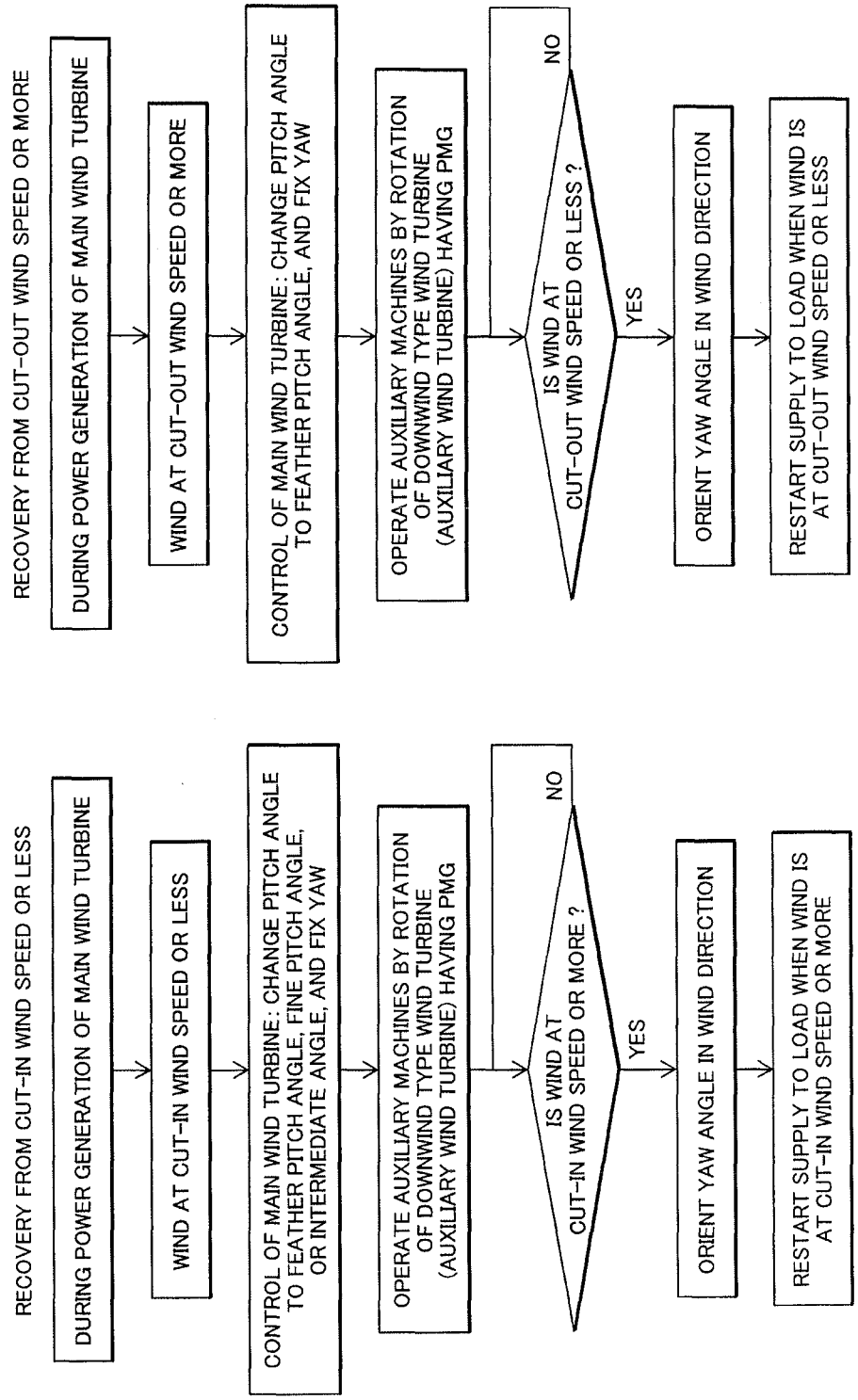
FIG. 7 explains an operation flow of the wind power generation system of Example 2.

Example 2 is explained using FIGS. 5 to 7. This example is the most different from Example 1 in that a main wind turbine 20 is an upwind type wind turbine operating with facing upwind. In this example, the yaw drive of a nacelle of an auxiliary wind turbine 21 is in the free yaw condition.

In the following, only the difference between this example and Example 1 is explained, and the similar explanation to that of Example 1 is abbreviated.

As shown in FIG. 5, when the structure of the wind power generation system itself is the same as Example 1 except that this example uses the upwind type wind turbine and Example 1 uses the downwind type wind turbine.

FIG. 6 shows a time chart. The same operation as Example 1 is possible roughly over an approximate elapse of time.

FIG. 7 shows an operation procedure as a flowchart. When the upwind type wind turbine is used, when the wind is under the cut-in wind speed, and when the wind is over the cut-out wind speed, the yaw is secured not to rotate naturally, and stopped. In the case where the wind is once under the cut-in wind speed or where the wind is over the cut-out wind speed, when the wind speed returns to the cut-in wind speed or more and to the cut-out wind speed or less, the yaw may need to be controlled to make the blades 5 of the main wind turbine 20 face upwind at first. The auxiliary machine power supply in this case is provided from the generated power of the auxiliary wind turbine. The yaw drive of the auxiliary wind turbine 21 in this example is in the free yaw condition. As in a weathervane, the blades 10 of the auxiliary wind turbine 21 rotate to face downwind although the nacelle 4 of the main wind turbine 20 is secured.

As in this example, even when the main wind turbine is the upwind type wind turbine, power generation is possible in response to the wind irrespective of the presence of and the state of the power grid.

Example 3

Figure 8:
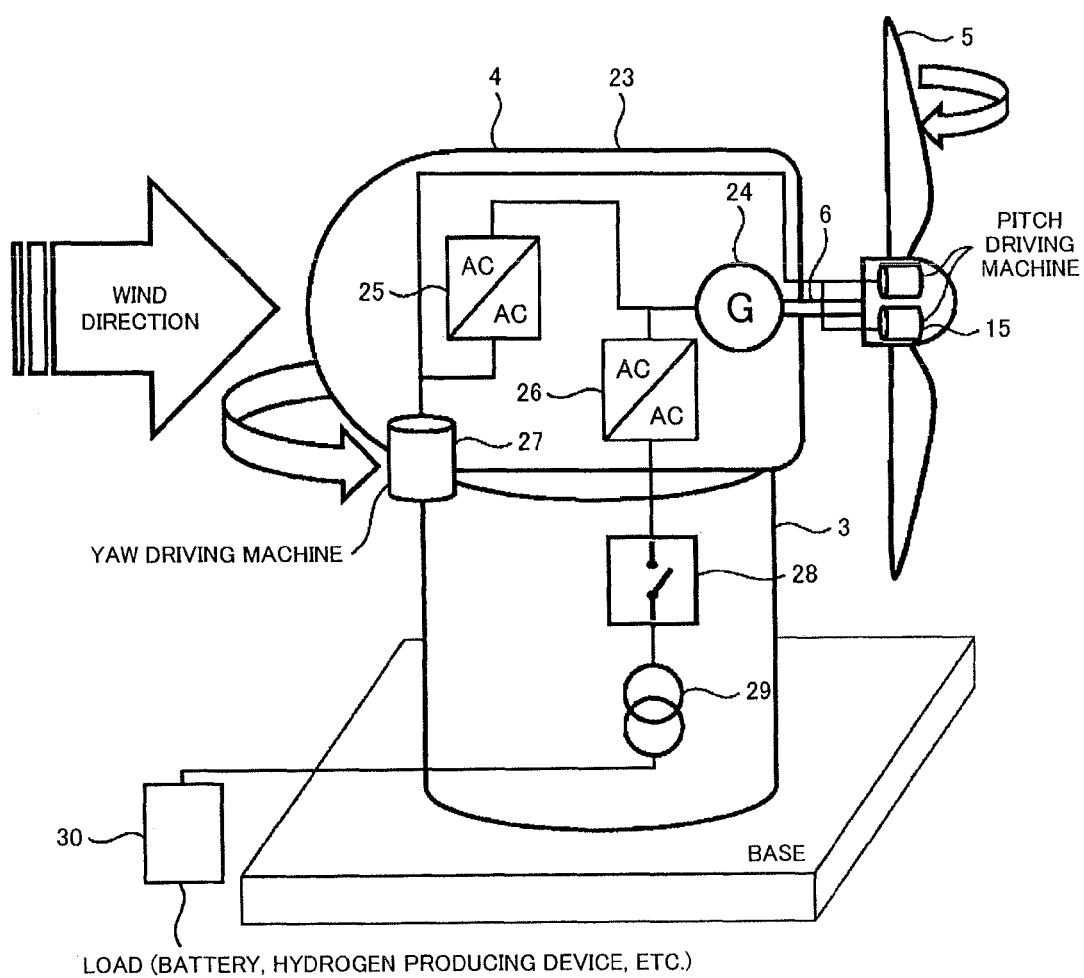
FIG. 8 shows a structure and one-line diagram of a wind power generation system of Example 3.
Figure 9:
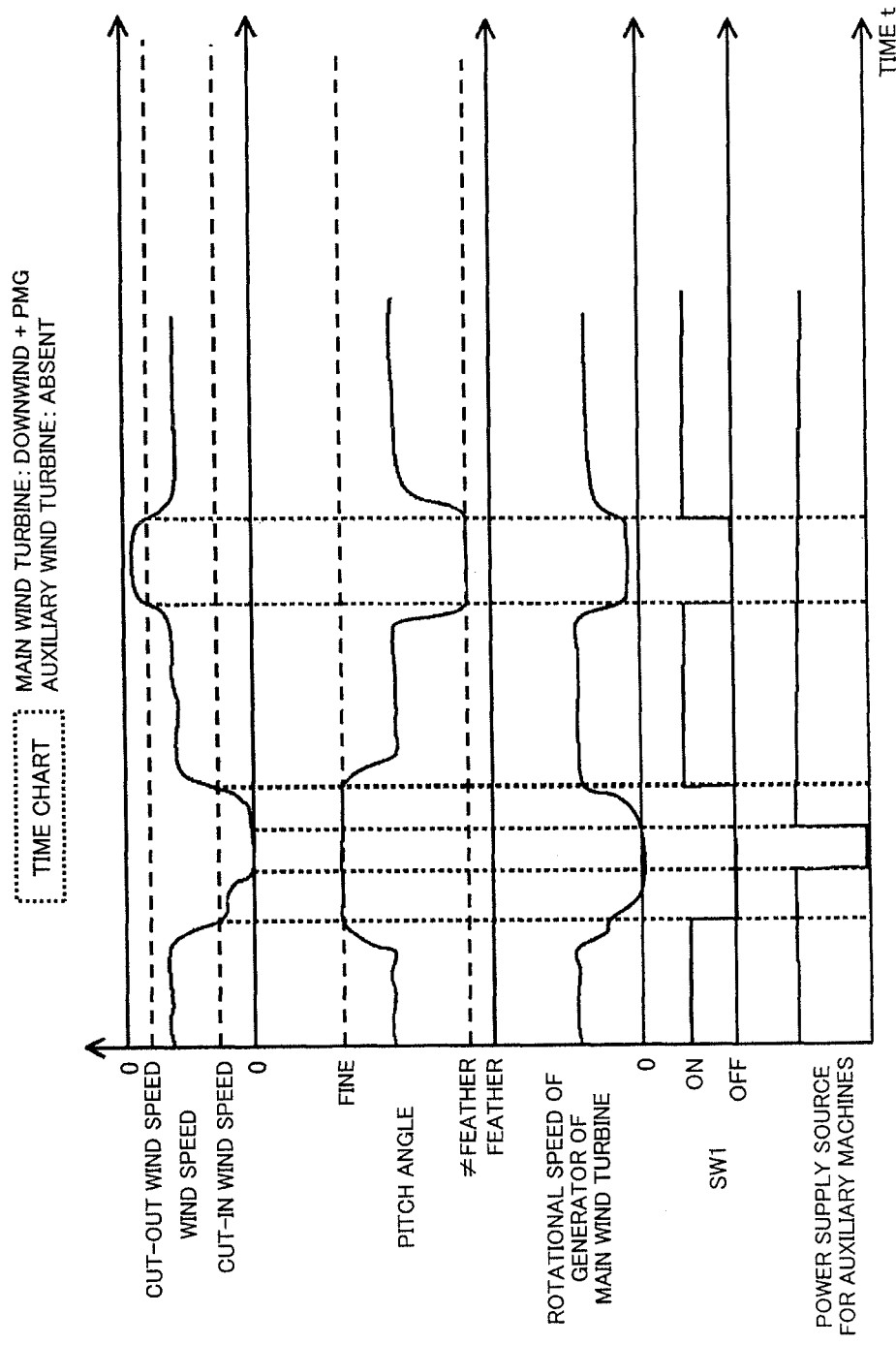
FIG. 9 shows a time chart of the wind power generation system of Example 3.
Figure 10:
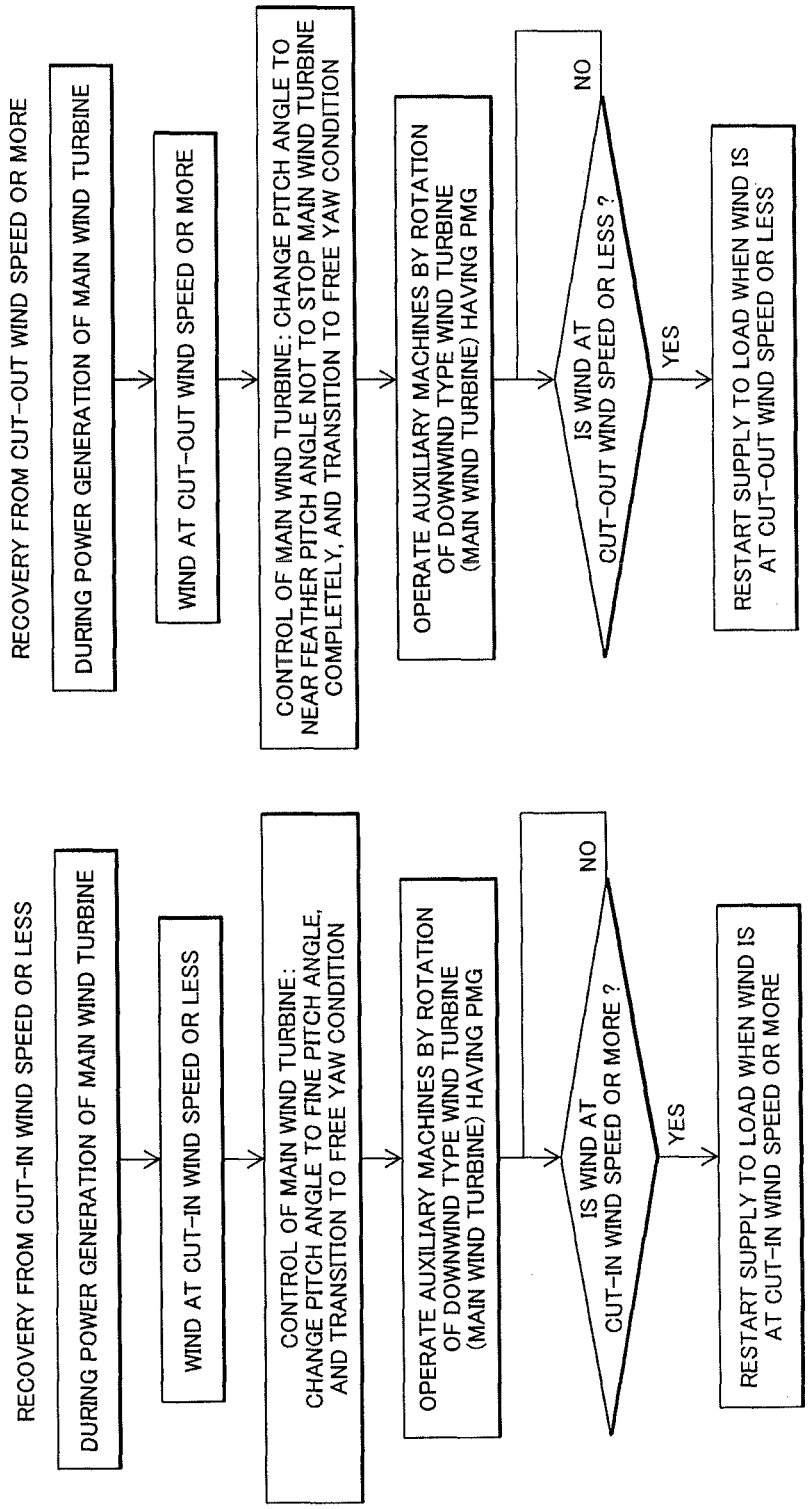
FIG. 10 explains an operation flow of the wind power generation system of Example 3.

Example 3 is explained using FIGS. 8 to 10. The similar explanation to those of the above examples is abbreviated. As shown in FIG. 8, in the wind power generation system of this example, unlike each of the above examples, only a main wind turbine 23, which is the downwind type wind turbine, is used and no auxiliary wind turbine is provided. A generator 24 in this example uses the permanent magnet type generator. The generator 24 is connected to power conversion systems 25 and 26. The power conversion system 25 corresponds to the power conversion system 13 of each of the above examples. The yaw driving machine 14 and the pitch driving machine 15 are connected ahead of the power conversion system 25. The power conversion system 26 corresponds to the power conversion system 16 of each above-mentioned example. A switch 28 is connected ahead of the power conversion system 26. A load 30 is connected ahead of the switch 28 via a transformer 29. The main wind turbine 23 in this example is the main wind turbine, and also functions as the auxiliary wind turbine in each of the above examples.

FIG. 9 shows a time chart. The cut-in wind speed in this example expresses the lowermost wind speed when the wind turbine 23 supplies the generated power to the load, and the cut-out wind speed expresses the uppermost wind speed in this example when the wind turbine 23 supplies the generated power to the load. In FIG. 9, at first, the wind speed shows a constant value in the wind speed range in which the power generation is possible and is in the normal state. In this case, the pitch angle of the blades 5 is maintained at or near an intermediate angle between the fine pitch angle and feather pitch angle. The generator 7 of the main wind turbine generates power while maintaining a generally uniform rotational speed. The switch 17 is closed (ON state) and the generated power from the generator 7 is supplied to the load 19.

Next, when the wind speed decreases suddenly to approach the cut-in wind speed, the pitch angle of the blades 5 transitions to the fine pitch angle such that the blades 5 are exposed to as much wind as possible. However, as the wind itself weakens, the rotational speeds of the generator 7 and the generator 12 of the auxiliary wind turbine decreases. Also in this case, the switch 17 is still in the closed state, and the generated power is supplied to the load.

In each of the above examples, when the wind speed decreases to be below the cut-in wind speed, the pitch angle of the blades 5 transitions to the feather pitch angle so that the blades 5 are not exposed to the wind. In this example, the blades 5 are left in the fine pitch angle. When the wind speed is below the cut-in wind speed, the switch 28 is opened (OFF state) not to exchange power between the generator 24 and load 30. The yaw is made free in response to the wind direction (free yaw) without the yaw control. The main wind turbine 23 is the downwind type wind turbine. Accordingly, in the free yaw condition, the blades 5 always face downwind to continue rotating and the generator 24 continues generating power. Since the auxiliary machines only control the pitch angle, the yaw, etc. and do not require great power, the auxiliary machine power supply can be provided even by low generated power.

When the wind speed decreases further in this state and the wind stops substantially, it is difficult to rotate the main wind turbine of this example. In this case, the auxiliary machine power supply is not provided, and the auxiliary machines are stopped safely.

After that, when the wind speed increases again, the blades 5 of the main wind turbine 23 restart rotating, and the auxiliary machine power supply is provided by rotation of the generator 24. As a result, the auxiliary machine power supply is provided, and the auxiliary machines restart.

When the wind speed increases further to be over the cut-in wind speed again, the switch 28 transitions to the closed state. Accordingly, the generated power is supplied to the load. After that, when the wind speed is between the cut-in wind speed and cut-out wind speed, the rotational speed of the generator 7 is maintained at a constant rotational speed while adjusting the pitch angle.

When the wind speed becomes higher from this condition, the pitch angle of the blades 5 is made close to the feather pitch angle to apply no excess wind pressure to the wind turbine 1. At this time, the rotational speed of the generator 24 decreases suddenly. Also in this case, since the auxiliary machines may not require high power, the auxiliary machine power supply can be provided by low generated power.

When the wind speed becomes higher to exceed the cut-out wind speed, the pitch angle of the blades 5 is switched to near the feather pitch angle. This is because, when the pitch angle is completely in the feather pitch angle, the rotation of the blades 5 stops, and it is difficult to restart the rotation. In consideration of safety of the wind turbine, it is necessary that the blades 5 are rotatable. The pitch angle may be positioned such that the rotational speed of the blades 5 is maintained to provide the auxiliary machine power supply by the generated power of the generator 24 at the cut-out wind speed. In this case, the yaw control of the main wind turbine 23 is released to be in the free yaw condition. Since the main wind turbine 23 is the downwind type wind turbine, the blades 5 face downwind in the free yaw condition. At more than the cut-out wind speed, the pitch angle of the blades 5 is not completely in the feather pitch angle, but is near the feather pitch angle. Therefore, even over the cut-out wind speed, the power generation can be continued. Therefore, the driving power source of the auxiliary machines can be provided.

After that, when the wind speed is at the cut-out wind speed or below, the pitch angle of the blades 5 is changed from the feather pitch angle to enlarge the swept area to rotate the blades 5. The yaw driving machine 14 performs yaw control. When the wind speed is at the cut-out wind speed or below, the switch 28 is switched to the closed state to supply the generated power to the load. After that, when the wind speed is between the cut-in wind speed and the cut-out wind speed, the generator 24 maintains a certain rotational speed while adjusting the pitch angle.

This flow is organized as shown in FIG. 10. That is, as the wind speed approaches the cut-in wind speed during the power generation of the main wind turbine, the pitch angle of the main wind turbine is changed to the fine pitch angle, and when the wind speed is below the cut-in wind speed, the yaw control transitions to the free yaw condition. Even when the wind speed is below the cut-in wind speed, the auxiliary machine power supply is freely provided from the main wind turbine because the main wind turbine is the downwind type wind turbine and the main wind turbine faces downwind naturally without the yaw control. After that, when the wind speed is over the cut-in wind speed, the pitch-angle control and yaw control are performed immediately, the switch 28 is made to enter the closed state, and thus the supply of the generated power to the load can be restarted.

When the wind speed exceeds the cut-out wind speed during the power generation of the main wind turbine, the pitch angle of the main wind turbine is changed to near the feather pitch angle, and the yaw control transitions to the free yaw condition. Even when the wind speed exceeds the cut-out wind speed, the auxiliary machine power supply is freely provided from the main wind turbine 23 because the main wind turbine 23 is the downwind type wind turbine to face downwind naturally without the yaw control. After that, when the wind speed is at the cut-out wind speed or below, the pitch-angle control and yaw control are performed immediately, and the power generation can be restarted by closing the switch 28.

According to this example, as described in each of the above examples, when the wind blows, the power generation can be performed without the auxiliary wind turbine irrespective of the presence of and the state of the power grid.

Figure 11:
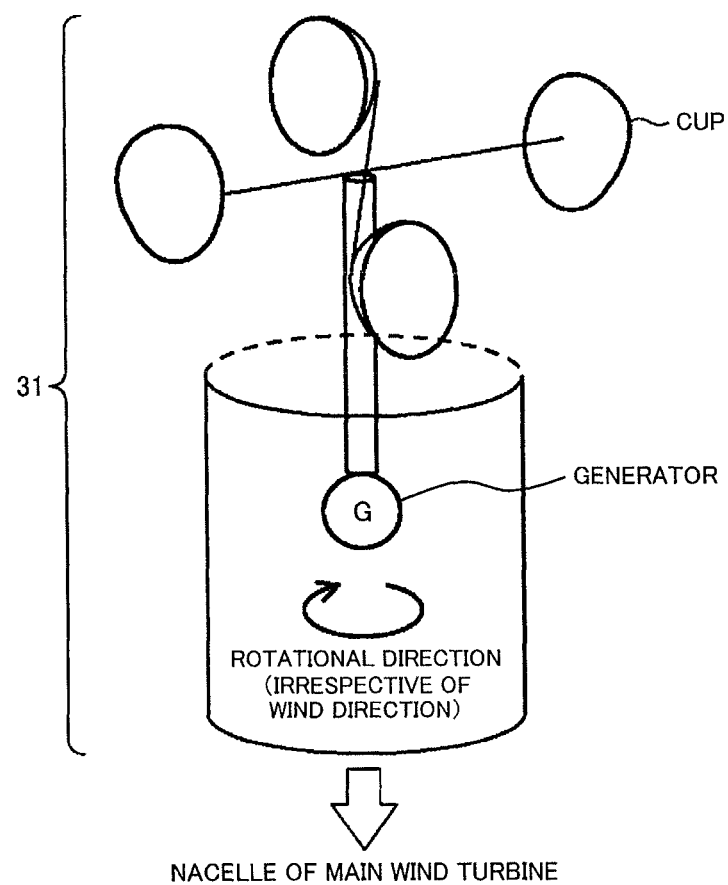
FIG. 11 explains a vertical-axis type wind turbine.
Figure 12:
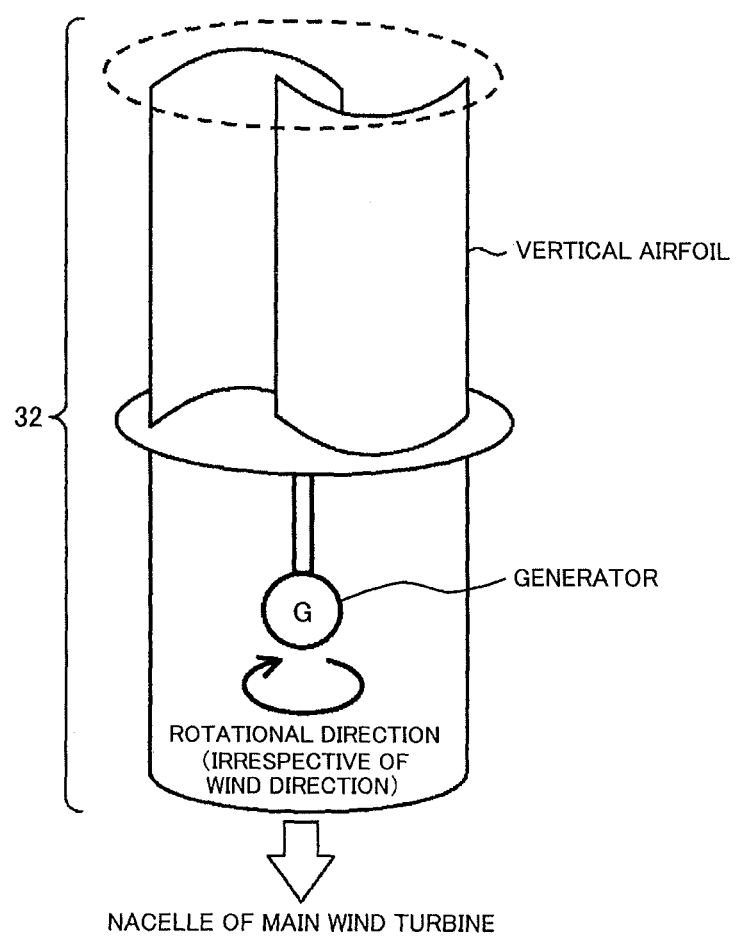
FIG. 12 explains a vertical-axis type wind turbine.
Figure 13:
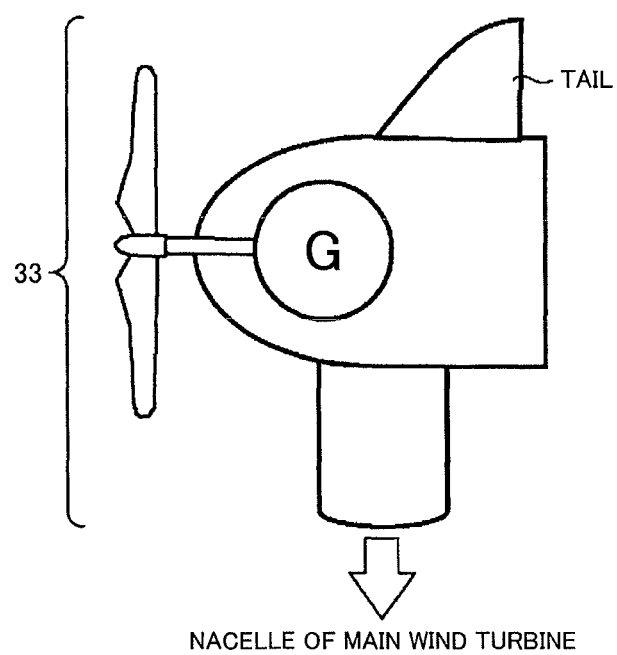
FIG. 13 explains a wind turbine having a tail.

In the above examples, the use of the downwind type wind turbine as the auxiliary wind turbine is explained. Instead of the downwind type wind turbine, any wind turbine that is able to generate power and to control a yaw without an auxiliary machine, such as vertical-axis type wind turbines 31 and 32 shown in FIG. 11 and FIG. 12 that generate power irrespective of a wind direction and a wind turbine with a tail shown in FIG. 13, can be used.

In each of the above examples, the permanent magnet type generator is mounted to at least one of the auxiliary wind turbine and the main wind turbine (in Example 3, only to the main wind turbine). Instead of this permanent magnet type generator, an excitation type generator and a battery that provides an initial excitation power for excitation type generator can be provided.

In this case, the excitation type generator during power generation may need to provide its own excitation power by itself, and to charge the battery by its own generated power to be ready for the subsequent restarts.

REFERENCE SIGNS LIST 1, 2, 20, 21, 23 . . . wind turbines
3, 8 . . . column
4, 9, 22 . . . nacelle
5, 10 . . . blade
6, 11 . . . shaft
7, 12, 24 . . . generator
13, 16, 25, 26 . . . power conversion system
14, 27 . . . yaw driving machine
15 . . . pitch driving machine
17, 28 . . . switch
18, 29 . . . transformer
19, 30 . . . load

The invention claimed is:

1. A method for operating a wind power generation system, the system comprising:
a main wind turbine that generates mainly power supplied to a load and/or a power grid;
an auxiliary wind turbine that supplies generated power to an auxiliary machine that controls a pitch angle of the main wind turbine and controls a yaw of the main wind turbine, that is a downwind type wind turbine that generates power in a state in which a blade of the auxiliary wind turbine faces downwind, and to which a permanent magnet type generator is mounted; and an anemometer that measures a wind speed, wherein the downwind type wind turbine is able to generate power in a wider wind speed range than a wind speed range in which power generation by the main wind turbine is possible, the auxiliary wind turbine rotates in a free yaw condition until the wind speed returns to within the wind speed range in which the power generation by the main wind turbine is possible after the wind speed is out of the wind speed range in which the power generation by the main wind turbine is possible, generated power of the auxiliary wind turbine drives the auxiliary machine to control the pitch angle or yaw of the main wind turbine when the wind speed returns to within the wind speed range in which the power generation by the main wind turbine is possible, and the power generation of the main wind turbine is restarted, wherein the downwind type wind turbine is able to generate power at a higher wind speed than a cut-out wind speed of the wind speed range in which the power generation by the main wind turbine is possible, the auxiliary wind turbine is able to rotate in the free yaw condition until the wind speed returns to the cut-out wind speed of the main wind turbine or less after the wind speed is over the cut-out wind speed, generated power of the auxiliary wind turbine drives the auxiliary machine to control the pitch angle or yaw of the main wind turbine when the wind speed returns to the cut-out wind speed or less, and power generation of the main wind turbine is restarted.

2. The method for operating a wind power generation system according to claim 1, wherein the downwind type wind turbine is able to generate power at a lower wind speed than a cut-in wind speed of the wind speed range in which the power generation by the main wind turbine is possible, the auxiliary wind turbine is able to rotate in the free yaw condition until the wind speed returns to the cut-in wind speed of the main wind turbine or more after the wind speed is below the cut-in wind speed, generated power of the auxiliary wind turbine drives the auxiliary machine to control the pitch angle or yaw of the main wind turbine when the wind speed returns to the cut-in wind speed or more, and power generation of the main wind turbine is restarted.

3. The method for operating a wind power generation system according to claim 1, wherein the pitch angle of the main wind turbine is in a feather pitch angle until the wind speed is returned to the cut-out wind speed of the main wind turbine or less after the wind speed is over the cut-out wind speed.

4. The method for operating a wind power generation system according to claim 1, wherein the main wind turbine is the downwind type wind turbine that generates power in a state in which a blade of the main wind turbine faces downwind.

5. The method for operating a wind power generation system according to claim 4, wherein a pitch angle of the blade of the main wind turbine is in a fine pitch angle until the wind speed returns to the cut-in wind speed of the main wind turbine or more after the wind speed of the main wind turbine is below the cut-in wind speed.

6. The method for operating a wind power generation system according to claim 1, wherein the main wind turbine is an upwind type wind turbine that generates power in a state in which a blade of the main wind turbine faces upwind, and the blade of the main wind turbine is controlled to face upwind before a restart of the power generation of the main wind turbine.

7. A method for operating a nuclear power plant using the method according to claim 1, wherein the wind power generation system is connected to a nuclear power plant and able to supply power to the nuclear power plant, the nuclear power plant is connected also to a solar power generation system and able to receive power from the solar power generation system, the wind power generation system and the solar power generation system are connected to an auxiliary power supply battery of the nuclear power plant, the wind power generation system supplies generated power to the nuclear power plant and/or the auxiliary power supply battery within the wind speed range in which the power generation is possible, and generated power from the solar power generation system or power from the auxiliary power supply battery is supplied to the nuclear power plant outside the wind speed range in which the power generation is possible.

* * * * *